(12) United States Patent
Gong et al.

(10) Patent No.: US 12,488,297 B2
(45) Date of Patent: Dec. 2, 2025

(54) PERSONAS DETECTION AND TASK RECOMMENDATION SYSTEM IN NETWORK

(71) Applicant: Cisco Technology, Inc., San Jose, CA (US)

(72) Inventors: Qixu Gong, Santa Clara, CA (US); Doosan Jung, Lakewood, CO (US); Qihong Shao, Clyde Hill, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 153 days.

(21) Appl. No.: 17/973,121

(22) Filed: Oct. 25, 2022

(65) Prior Publication Data
US 2024/0135279 A1 Apr. 25, 2024
US 2024/0232747 A9 Jul. 11, 2024

(51) Int. Cl.
G06Q 10/00 (2023.01)
G06Q 10/0631 (2023.01)

(52) U.S. Cl.
CPC ............... G06Q 10/063118 (2013.01)

(58) Field of Classification Search
None
See application file for complete search history.

(56) References Cited

U.S. PATENT DOCUMENTS

| | | | | |
|---|---|---|---|---|
| 8,805,713 B2 * | 8/2014 | Duffy | ................. | G06Q 10/10 |
| | | | | 705/7.14 |
| 9,754,117 B2 * | 9/2017 | Bender | ................. | H04L 63/10 |
| 2010/0174577 A1 * | 7/2010 | Duffy | ............ | G06Q 10/063118 |
| | | | | 705/7.17 |
| 2010/0174578 A1 * | 7/2010 | Duffy | ............ | G06Q 10/063112 |
| | | | | 705/7.17 |
| 2015/0242619 A1 * | 8/2015 | Bender | ................. | H04L 63/10 |
| | | | | 726/22 |
| 2016/0335327 A1 | 11/2016 | Kanakadandi et al. | | |
| 2018/0232751 A1 * | 8/2018 | Terhark | ......... | G06Q 10/063118 |
| 2018/0374025 A1 | 12/2018 | Kotamraju et al. | | |
| 2019/0266014 A1 * | 8/2019 | Bahl | ................. | G06N 20/00 |
| 2020/0159501 A1 | 5/2020 | Bodin et al. | | |
| 2020/0160458 A1 * | 5/2020 | Bodin | ................. | G06F 40/30 |

(Continued)

OTHER PUBLICATIONS

Zenarmor, What are Best Practices for Firewall Rules Configuration?, Mar. 1, 2022, Zenarmor, https://www.zenarmor.com/docs/network-security-tutorials/best-practices-for-firewall-rules-configuration, p. 1-8. (Year: 2022).*

(Continued)

*Primary Examiner* — Joseph M Waesco
(74) *Attorney, Agent, or Firm* — Edell, Shapiro & Finnan, LLC

(57) ABSTRACT

Methods are provided in which a computing device obtains user data and network data associated with one or more assets used in an enterprise network of a user. The computing device further determines an identity of the user based on the user data and the network data and generates a task recommendation based on the identity of the user. The task recommendation includes one or more tasks having a plurality of operations that are to be performed within a predetermined time interval. The computing device further provides the task recommendation for performing one or more actions associated with configuring the enterprise network.

20 Claims, 11 Drawing Sheets

(56) References Cited

U.S. PATENT DOCUMENTS

| | | | | |
|---|---|---|---|---|
| 2020/0210964 | A1* | 7/2020 | Monovich | G06Q 10/063114 |
| 2021/0150483 | A1* | 5/2021 | Carlberg | G09B 7/02 |
| 2021/0392156 | A1 | 12/2021 | Singh | |
| 2022/0067551 | A1* | 3/2022 | Wei | G06N 5/046 |
| 2022/0067814 | A1 | 3/2022 | Goncalves et al. | |
| 2022/0366277 | A1* | 11/2022 | DeFilippo | G06Q 30/016 |
| 2023/0068096 | A1* | 3/2023 | Patti | G06F 9/4881 |
| 2024/0135279 | A1* | 4/2024 | Gong | G06Q 10/063118 |

OTHER PUBLICATIONS

Geyik, S. et al., "Fairness-Aware Ranking in Search & Recommendation Systems with Application to LinkedIn Talent Search," https://dl.acm.org/doi/10.1145/3292500.3330691, Jul. 25, 2019, 6 pages.

Xia, Y. et al., "IGATA: an Attraction-Based Online Task Recommendation Framework in Freemium-Crowdsourcing Platform," 2019 IEEE 25th International Conference on Parallel and Distributed Systems (ICPADS), https://ieeexplore.ieee.org/document/8975815, Jan. 30, 2020, 8 pages.

Sun, K. et al., "Where to Go Next: Modeling Long- and Short-Term User Preferences for Point-of-Interest Recommendation," The Thirty-Fourth AAAI Conference on Artificial Intelligence (AAAI-20), https://www.researchgate.net/publication/341907286_Where_to_Go_Next_Modeling_Long_-_and_Short-Term_User_Preferences_for_Point-of-Interest_Recommendation, retrieved Aug. 9, 2022, 8 pages.

Reimers, N. et al., "Sentence-BERT: Sentence Embeddings using Siamese BERT-Networks," Association for Computational Linguistics, https://www.sbert.net/, Nov. 2020, 9 pages.

* cited by examiner

PERSONAS DETECTION AND TASK RECOMMENDATION SYSTEM IN NETWORK

TECHNICAL FIELD

The present disclosure generally relates to computer networks and systems.

BACKGROUND

Enterprise networks include many assets and involve various enterprise service functions for equipment and software. Enterprise networks are often managed by a team of information technology (IT) specialists. This is particularly the case for enterprises that have large networks or systems of numerous instances and types of equipment and software. Tracking performance, troubleshooting, and integrating new technology and/or updates for networking or equipment and software in large enterprise networks is time consuming and often requires support and guidance from providers or third-party entities. Understanding the persona of the IT specialist is important to providing proper support and guidance.

DETAILED DESCRIPTION

Overview

Techniques presented herein provide a task recommendation system that generates customized task recommendations based on applying machine learning to multiple data sources to determine the identity of a user.

In one form, a computing device obtains user data and network data associated with one or more assets used in an enterprise network of a user and determines an identity of the user based on the user data and the network data. The computing device further generates a task recommendation based on the identity of the user. The task recommendation includes one or more tasks having a plurality of operations that are to be performed within a predetermined time interval. The computing device further provides the task recommendation for performing one or more actions associated with configuring the enterprise network.

Example Embodiments

Figure 1:
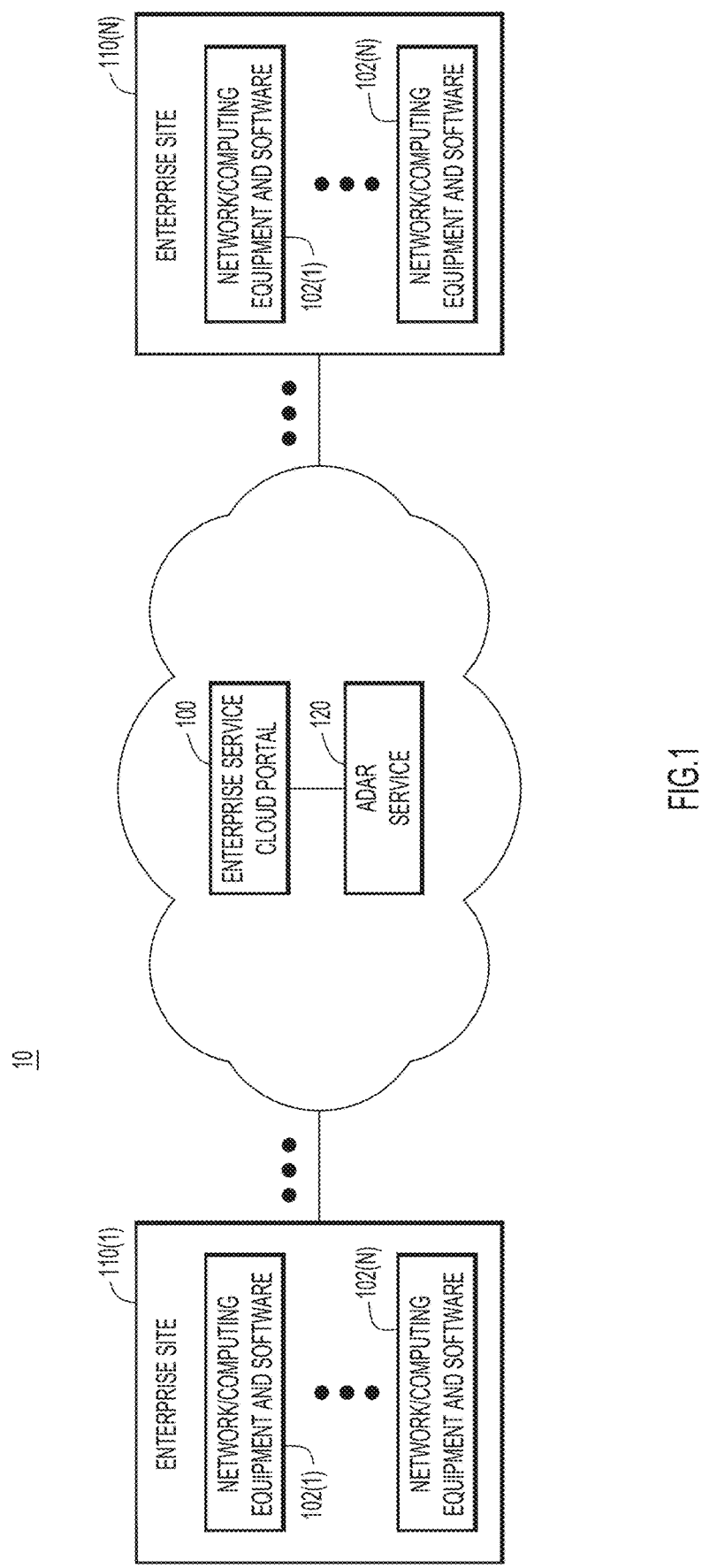
FIG. 1 is a block diagram of a system that includes an identity detection and task recommendation service that interacts with an enterprise service cloud portal and network/computing equipment and software residing at various enterprise sites, according to an example embodiment.

FIG. 1 is a block diagram of a system 10 that includes an identity detection and task recommendation service 120 that interacts with an enterprise service cloud portal (cloud portal) 100 and network/computing equipment and software 102(1)-102(N) residing at various enterprise sites 110(1)- 110(N), or in cloud deployments of an enterprise, according to an example embodiment.

The notations 1, 2, 3, . . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The network/computing equipment and software 102(1)- 102(N) are resources or assets of an enterprise (the terms "assets" and "resources" are used interchangeably herein). The network/computing equipment and software 102(1)-102 (N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)- 102(N) may further include endpoint or user devices such as a personal computer, laptop, tablet, and so on. The network/ computing equipment and software 102(1)-102(N) may include virtual nodes such as virtual machines, containers, point of delivery (PoD), and software such as system software (operating systems), firmware, security software such as firewalls, and other software products. The network/ computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when needed and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, and so on. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks.

A network technology is a computing-based service or a solution that solves an enterprise network or a computing problem or addresses a particular enterprise computing need. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VoIP) services, managing traffic flows, analytics services, etc. Some network technology solutions apply to virtual technologies or resources provided in a cloud or one or more data centers. The network technology solution implements a particular enterprise outcome and is often deployed on one or more of the network/computing equipment and software 102(1)-102(N).

An adoption of network technology solution refers to enterprise's uptake and utilization of a network technology for achieving a desired outcome. A journey refers to end-to-end activities performed by an enterprise when adopting a network technology including tasks they perform and defined stages to progress. An adoption lifecycle refers to a step-by-step guidance along the adoption journey to accelerate the speed to value of a network technology. The adoption lifecycle may encompass the end-to-end journey stages of: need, evaluate, select, align, purchase, onboard, implement, use, engage, adopt, optimize, recommend, advocate, and accelerate.

As noted above, various IT specialists interact with the cloud portal 100 to manage equipment and software of the enterprise. Proper guidance, support, and other insights to help the user manage equipment and software of the enterprise via the cloud portal 100 are important. To provide proper guidance and/or for navigating the cloud portal 100, an identity detection and task recommendation (ADAR) service 120 applies machine learning (ML) to user data and enterprise network data to determine the identity of the user. The ADAR service 120 learns the identity of the user (persona(s) and role(s)) to generate customized, user-specific task recommendations.

A task recommendation includes one or more tasks to be performed for configuring the enterprise network. Each task includes one or more operations executed within a predetermined time interval. Task recommendations are specifically tailored to the user's job or role in managing equipment and software of the enterprise network. For example, the ADAR service 120 generates a list of tasks for the user to perform using the cloud portal 100. In one example, at least some of the tasks may be performed by the ADAR service 120 itself or by the ADAR service 120 and the cloud portal 100 such as changing a configuration of a particular asset, updating software asset to a newer version, etc. The user is then notified that these automated tasks were performed.

While one or more example embodiments describe task recommendations with respect to the cloud portal 100, this is just an example. Task recommendations may involve other services and systems. For example, task recommendations may include a link to a newer version of software available for downloading at an external website or a direct connection to an enterprise asset (network device) that needs to be reconfigured, etc. In other words, the ADAR service 120 generates daily task recommendations that may or may not involve the cloud portal 100 based on determining the user identity and the job that needs to be performed in managing equipment and software of the enterprise.

Figure 2:
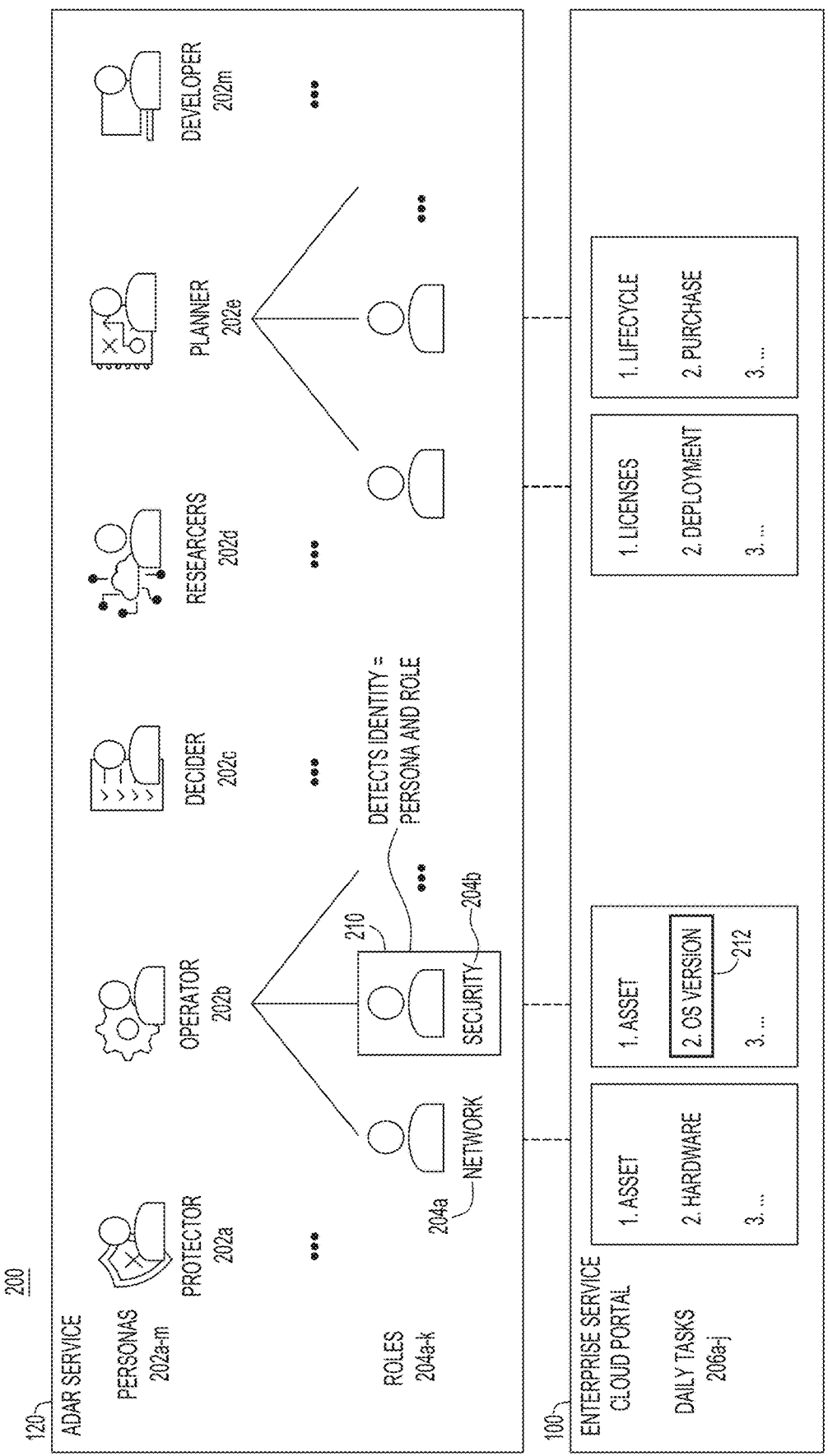
FIG. 2 is a view illustrating user identities that have different roles and daily tasks, according to an example embodiment.

With continued reference to FIG. 1, FIG. 2 is a view illustrating user identities 200 that have different roles and daily tasks, according to an example embodiment. The user identities 200 may include, by way of an example, a plurality of personas 202a-m such as a protector 202a, an operator 202b, a decider 202c, a researcher 202d, a planner 202e, and a developer 202m. Same persona may have different roles 204a-k and/or different daily tasks 206a-j. To provide accurate recommendations for daily tasks 206a-j, the ADAR service 120 determines one or more personas and one or more roles of the user, collectively referred to as "user identity".

Different enterprises may have their own personas 202a-m. For example, the operator 202b focuses on asset management such as status and performance of the network equipment and software 102(1)-102(N), whereas the planner 202e focuses on an overall performance of the enterprise network (whether the enterprise has enough resources/assets to meet the requirements, etc.) Further, even users with the same persona, may have different daily tasks 206a-j depending on the type, size, and job segmentation of their enterprise. For example, the operator 202b may have a network role 204a that focuses on hardware assets of the enterprise or may have a security role 204b that focuses on operating system versions of the enterprise assets. Moreover, users with the same persona may be responsible for different jobs in different enterprises. For example, the planner 202e of Company 1 may focus on enterprise network's reliability and stability while the planner 202e of Company 2 may focus on increasing the present network workload. Since different user identities in different enterprises result in different daily tasks 206a-j, it may be difficult for the cloud portal 100 to provide meaningful guidance, insights, etc.

In one or more example embodiments, the ADAR service 120 determines the identity of the user (one or more of personas 202a-m and/or roles 204a-k), as shown at 210. The ADAR service 120 then generates user-specific daily task recommendation(s), shown at 212 (one or more of the daily tasks 206*a-j*) based on the identity of the user and enterprise information (network data).

Specifically, the ADAR service 120 analyzes a plurality of data sources to pair numerous data sources with user-defined role information. The ADAR service 120 applies machine learning (ML) to available information about the user and their enterprise to understand the context/the identity of the user (the user's persona, role, enterprise, etc.). The ADAR service 120 then generates user-specific task recommendations that are customized to the unique identity of the user within the enterprise.

In one or more example embodiments, the ADAR service 120 may further prioritize daily tasks to top priority jobs based on user history data, user profiles, and network status. The ADAR service 120 may further generate a cold start task recommendation optimization through ML by comparing similarly situated peers, as described in further detail below. Moreover, the ADAR service 120 provides a feedback loop in which tasks performed by the user (in the cloud portal 100, for example) are reported to the ADAR service 120, which learns from the user completed or adjusted tasks to further improve model accuracy. Additionally, the ADAR service 120 detects and defines previously undefined tasks (new tasks) based on user usage data to improve how users interact with the cloud portal 100 and/or other systems for managing the enterprise network and its assets.

The ADAR service 120 is a ML-based system that provides identity detection to further enhance task recommendations and maximize utilization of the cloud portal 100, for example. The ADAR service 120 detects user personas, further breaks down personas into different roles, and combines use patterns and current state of the enterprise network (networking environment) to customize recommended tasks specific to each user and user's job.

Figure 3:
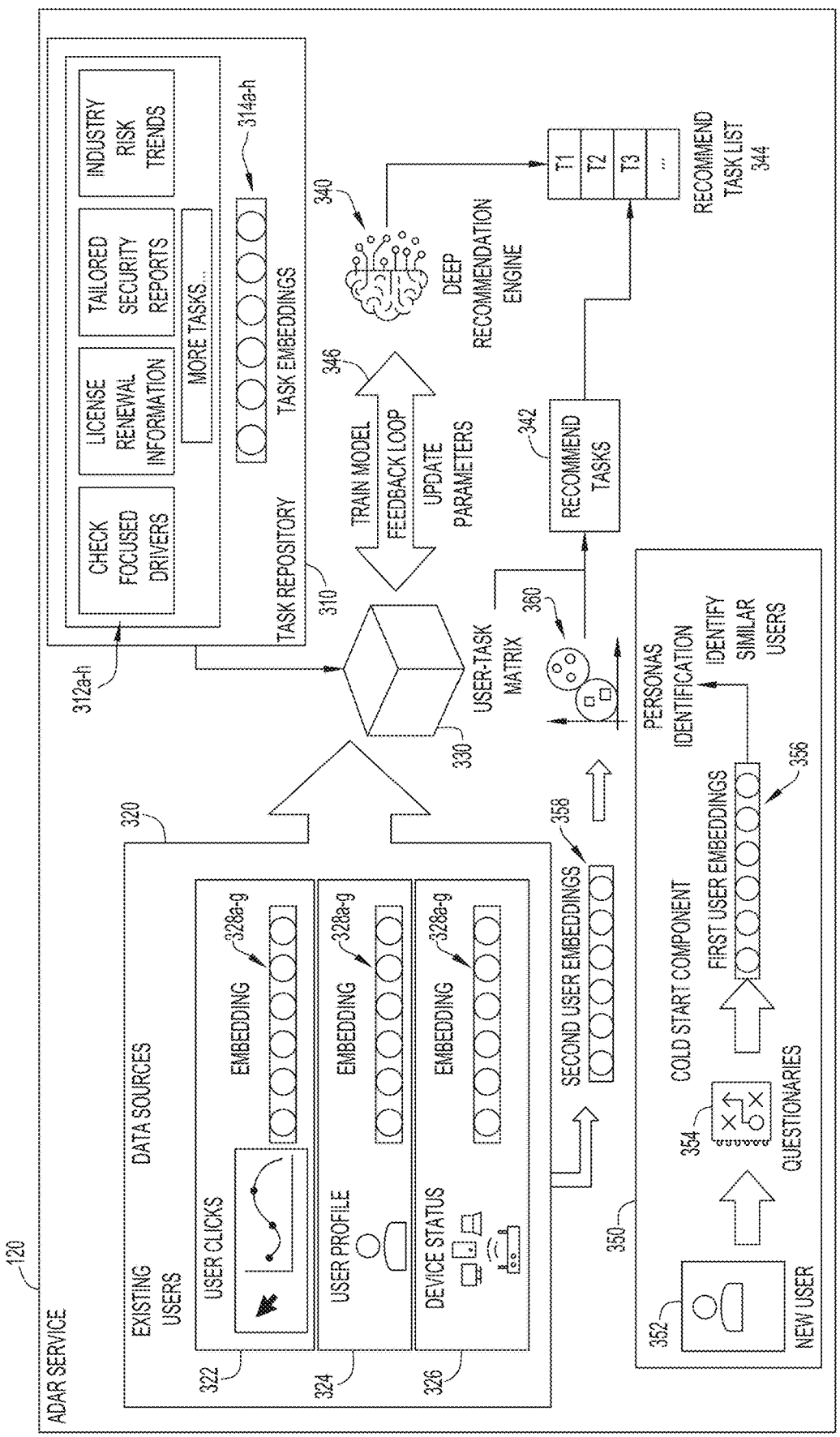
FIG. 3 is a block diagram illustrating components of an identity detection and task recommendation service, according to an example embodiment.

With continued reference to FIGS. 1 and 2, FIG. 3 is a block diagram illustrating components of the ADAR service 120, according to an example embodiment. The ADAR service 120 includes a task repository 310, data sources 320, a user-task matrix 330, a deep recommendation engine 340, and a cold start component 350.

Domain experts define a plurality of tasks 312*a-h* and store them in the task repository 310. The plurality of tasks 312*a-h* are defined by analyzing historical records, user behavior patterns, and business requirements. A task includes different operations performed by a user within a predetermined or pre-defined time interval e.g., one to five seconds, one minute, etc. An operation involves one or more clicks or manipulations of a component in system(s) such as the cloud portal 100. In one example, a task may be an automated task that is performed by the ADAR service 120 itself (or ADAR service 120 in connection with the cloud portal 100 or the enterprise network) such as changing a configuration of an asset in the enterprise network (upgrade software, change connection port of a network device, etc.). In this case, user notification is generated indicating progress or completion of the automated task.

The plurality of tasks 312*a-h* may include contextual information (support material or resources) from a technical assistance center (TAC) service requests (SRs), product collateral such as instruction manuals and user manuals, technical sites, learning and training materials, security notices, intellectual capital (IC) generated based on artificial intelligence (AI)/machine learning (ML), product cases/issues, and integrated insights and analytics on one or more assets/resources across dimensions such as health/risk, stability, capacity, and aging. For example, the plurality of tasks 312*a-h* may include check focused devices, license renewal information, tailored security reports, industry risk trends, expiration dates, etc. The task repository 310 stores the plurality of tasks 312*a-h* in a vectorized form as task embeddings 314*a-h*.

The data sources 320 include different types of information about users and/or enterprise networks. For example, the data sources 320 include enterprise behavior (use patterns of the network/computing equipment and software 102(1)-102(N), at various enterprise sites 110(1)-110(N) of FIG. 1), product telemetry data obtained by monitoring products (the network/computing equipment and software 102(1)-102(N) of the enterprise), other telemetry data (operational states, updates and configuration related data, faults, errors, etc.), enterprise data (purchase contracts, service contracts, warranty service agreements, and asset information i.e., data about network/computing equipment and software 102(1)-102(N), at various enterprise sites 110(1)-110(N)). The data sources 320 are collected or gathered from various data repositories such as repositories of existing enterprise networks, enterprise network controllers (not shown), and/or the cloud portal 100 of FIG. 1.

In one example embodiment, the data sources 320 involve three types of information: user clicks history 322, user profiles 324, and device states 326 (status of enterprise assets such as the network/computing equipment and software 102(1)-102(N)).

User clicks history 322 involves user behavior or interactions with various system(s) such as the cloud portal 100. The user clicks history 322 is indicative of the one or more actions performed by the user with respect to one or more components of the enterprise network. For example, a user action may include clicking on a particular function (asset management page) within the cloud portal 100.

User profiles 324 include job titles, job descriptions, enterprise types, sizes, etc. The user profiles 324 identifies a job title of the user (user persona(s)), user role(s) within the enterprise network. A user profile identifies the one or more actions to be performed by the user for configuring the enterprise network. A user profile may further identity asset type(s) of the enterprise assets that the user is responsible for and in what aspects (security, maintenance, performance, etc.).

Device states 326 include static attributes (geolocation, role, product family, etc.) and information security (e.g., security advisory), software end of life/expiration, hardware end of life/expiration, etc. Device states 326 include the state of the enterprise network itself, security information related to the one or more assets and the enterprise network, one or more network technologies being deployed using the one or more assets of the enterprise network, and/or progression of each deployment of the one or more network technologies.

The data sources 320 are embedded to form data vectors 328*a-g*. For example, the user clicks history 322 is time-series data that is embedded using recurrent neural network (RNN). The user profiles 324 and the device states 326 are embedded using deep machine learning models. The data vectors 328*a-g* are added to the user-task matrix 330.

The user-task matrix 330 is a three-dimensional representation of correlation information between user identities and tasks in a time domain. In the user-task matrix 330, the plurality of embedded tasks 314*a-h* and the data vectors 328*a-g* are correlated in the time domain.

The deep recommendation engine 340 analyzes the user-task matrix 330 to select recommended tasks 342 from the user-task matrix 330 based on the identity of the user and current date and time. The deep recommendation engine 340 generates a recommended task list 344 that includes the selected recommended tasks 342 (e.g., task T1, task T2, task T3, etc.). The recommended task list 344 is provided to the user e.g., displayed on a display, displayed on a user console, displayed on a dashboard in the cloud portal 100 of FIG. 1, etc.

The deep recommendation engine 340 uses a feedback loop 346 to update parameters and train the model (correlation information) in the user-task matrix 330. That is, the deep recommendation engine 340 monitors interactions of the user with the recommended task list 344 and updates the user-task matrix 330 based on the foregoing.

For example, based on user interactions, the embedded tasks 314*a-h* may be reordered (change priority), some tasks may be removed, moved to different time, etc. in the user-task matrix 330. As another example, the deep recommendation engine 340 may determine that when task T1 ("update software on a network device A of the enterprise network") is included in the recommended task list 344, the user does not perform this task T1 unless the time is before 9 am or after 5 pm. Based on the foregoing, the deep recommendation engine 340 updates the user-task matrix 330 by removing the task T1 from the time domain 9 am to 5 pm. In other words, when the current time is between 9 am to 5 pm, the task T1 is not recommended (not added to the recommended task list 344).

The deep recommendation engine 340 uses the correlation information between the embedded tasks 314*a-h* and the data vectors 328*a-g* in the user-task matrix 330 to generate a list of sorted jobs (e.g., in a form of the recommended task list 344) for the identified user. Moreover, the deep recommendation engine 340 may use ML clustering-based model to identify user personas 202*a-m* of FIG. 2 and roles 204*a-k* of FIG. 2 of each persona.

The cold start component 350 is configured to onboard new users (a new user 352) that do not have historical user clicks data. Due to lack of previous data on user clicks history, when the new user 352 joins, the cold start component 350 generates questionnaires 354. The questions in the questionnaires 354 are based on existing users' identities (personas, positions, roles, etc.) and actions (behaviors). The questionnaires 354 includes one or more questions designed to determine persona(s) and one or more of the roles 204*a-k* of FIG. 2 assigned to the new user 352. Responses to the questionnaires 354 are used instead of user clicks history 322. Specifically, the cold start component 350 generates a first user embeddings 356 based on the responses to the questionnaires 354.

The cold start component 350 also obtains second user embeddings 358. The second user embeddings 358 include a user profile data embedding and a network data embedding (current enterprise network state and its assets) selected from the data vectors 328*a-g*. Based on the first user embeddings 356 and the second user embeddings 358 (three types of information), the cold start component 350 determines similar users and retrieves their identities. Specifically, at 360, the cold start component 350 identifies the persona of the new user 352 based on applying one or more ML models (clustering, etc.) of similar users. Based on the identification of the new user 352, the recommended tasks 342 are selected by extracting correlation information from the user-task matrix 330 of similar peers. The deep recommendation engine 340 generates the recommended task list 344 for the new user 352. Recommended task list 344 includes tasks performed by similar users.

For example, the new user 352 is also new to the cloud portal 100 of FIG. 1. The new user 352 does not know how to use the cloud portal 100 effectively. The ADAR service 120 generates the questionnaires 354 that include questions to learn characteristics of the new user 352 (such as job title and job roles). Responses are then combined with enterprise network status (network data) and user profile data to determine similar users. The ADAR service 120 identifies that similar users serve as protectors and operators for a similar enterprise network in terms of enterprise size and conditions. Similar users perform daily tasks that involve (1) making daily queries for device licensing dates, (2) checking device risk levels, and (3) searching for relevant documents for security suggestions. The ADAR service 120 then recommends or suggests similar tasks to the new user 352. That is, the recommended task list 344 includes task T1 (a link to device licensing dates), task T2 (a link to device risk levels), and task T3 (relevant security advisories for the network devices).

The new user 352 may further optimize the recommended task list 344 to meet their individual requirements. At the same time, the ADAR service 120 generates personalized task recommendations based on daily job completions and cloud portal 100 usage using the feedback loop 346. In other words, The ADAR service 120 allows the new user 352 to modify and/or manipulate the personalized task recommendations by adding/removing/modify/sorting recommended tasks 342 on their daily task list. The ADAR service 120 further allows the new user 352 to define new or custom tasks based on their business requirements. Meanwhile, using the feedback loop 346, the deep recommendation engine 340 (backend ML) collects finished tasks, in progress tasks, and/or undefined tasks to update parameters and train the model in the user-task matrix 330.

With continued reference to FIGS. 1-3, FIG. 4 is a diagram illustrating a user profile embedding process 400 in which user profile information is embedded for determining an identity of the user, according to an example embodiment. The user profile embedding process 400 is performed by the ADAR service 120 executing on one or more servers. The user profile embedding process 400 involves generating one or more of the data vectors 328*a-g* based on one of the user profiles 324 of FIG. 3.

The user profile embedding process 400 involves collecting user attributes 402*a-f* such as, but not limited to, user role(s), a job title, company type, leadership characteristics, and workplace environment. The user role(s) are based on user behavior such as user's interactions with the cloud portal 100. The company type is based on the enterprise's type of business and number and type of enterprise sites 110(1)-110(N) and network/computing equipment and software 102(1)-102(N). The leadership of the user is determined based on user decisions (signatures, purchases, etc.) obtained by monitoring interactions with the cloud portal 100 and/or external systems. The workplace environment describes the enterprise network such as the location of the equipment in charge (location of the enterprise controller), etc.

If the user attributes 402*a-f* are in a numeric form, the ADAR service 120 directly uses numerical embeddings. On the other hand, if the user attributes 402*a-f* are in a form of category data, embedding or encoding is performed to map the labels to binary vectors. Specifically, at 404, the ADAR service 120 performs one-hot embedding of the user role 402*a* generating a binary role vector 406. Binary vectors of the user attributes 402*a-f* are then combined to form one of the data vectors 328*a-g* such as the user profile data vector 408.

With continued reference to FIGS. 1-3, FIG. 5 is a diagram illustrating a network data embedding process 500 in which network data is embedded for determining the identity of the user, according to an example embodiment. The network data embedding process 500 is performed by the ADAR service 120 executing on one or more servers. The network data embedding process 500 involves generating one or more of the data vectors 328a-g based on device states 326 of FIG. 3.

The network data includes device states and network status information including the size of the enterprise network. The network status information involves, among others, the security status of the network devices (network/computing equipment and software 102(1)-102(N)), product families, and/or the scale of the enterprise network. The network data aids the ADAR service 120 in analyzing information such as the daily workload and the difficulty of plan development for the users. The network device states information is well-organized and is encoded, by the ADAR service 120, in their numeric formats.

However, in one example embodiment, analyzing static attributes alone may be insufficient to fully comprehend or learn the enterprise assets. Accordingly, the ADAR service 120 extracts source data 502 that involves various dynamic sources of information abouts risks present in the enterprise network. For example, the source data 502 may include, but is not limited to, total number of security advisories, number of critical security advisories, number of high risk security advisories, number of medium risk security advisories, number of low risk security advisories, total number of security vulnerability-related notices, number of high impact security vulnerability-related notices, number of low impact security vulnerability-related notices, software expiration, hardware expiration, list of security advisories/security vulnerability-related notices for each device in the enterprise network, and/or details of each security advisory/security vulnerability notice. By analyzing the source data 502, the ADAR service 120 learns the enterprise network and daily tasks that need to be performed for the enterprise network. In one example, the ADAR service 120 extracts further information 504 such as, but not limited to, dynamic states of the network devices in the enterprise network.

The ADAR service 120 uses the source data 502 and further information 504 to generate a risk level binary vector 506 and an impact binary vector 508. The ADAR service 120 applies neural networks to generate the risk level binary vector 506 and the impact binary vector 508. The neural networks are just examples of sample modeling techniques but the disclosure is not limited thereto. Any risk evaluation models may be used to generate the risk level binary vector 506 and the impact binary vector 508.

The risk level binary vector 506 represents the probability of the enterprise network having an issue, an error, or a problem. The impact binary vector 508 represents dimensions of the risk level or the business impact on the enterprise network. For example, how likely is the issue or problem cause a security threat to the enterprise network and/or other network devices in the enterprise network. As another example, how likely is the issue cause congestion or slowdown in the enterprise network. To generate the impact binary vector 508, the ADAR service 120 may use sentence-BERT embedding in which security advisories and/or security vulnerability-related notices are embedded similarly to embeddings of given keywords by measuring their similarity to determine the primary and secondary impacts of the security advisory/security vulnerability-related notice. The different implications of a network device may be based on aggregating all its security advisories and security vulnerability-related notices.

With continued reference to FIGS. 1-3, FIG. 6 is a diagram illustrating a clicks history embedding process 600 in which clicks history data is embedded for determining the identity of the user, according to an example embodiment. The clicks history embedding process 600 is performed by the ADAR service 120 executing on one or more servers. The clicks history embedding process 600 involves generating one or more of the data vectors 328a-g based on the user clicks history 322 of FIG. 3.

The user clicks history 322 (click history data) is indicative of actions performed by the user with respect to one or more components/elements of the enterprise network. Some of the actions may involve interactions (clicking on) various components or functionalities in the cloud portal 100 and/or other systems. The ADAR service 120 further analyzes user actions with respect to the enterprise network. In other words, the ADAR service 120 obtains user interactions with enterprise platforms and/or network management systems. For example, the ADAR service 120 detects actions performed in the cloud portal 100 at time t1 and actions performed within the enterprise network at time t2 (connecting to a network device, configuring the network device, obtaining telemetry data, etc.).

In the clicks history embedding process 600, clicks history data is transformed into one or more of the data vectors 328a-g that provide meaningful representation of the user's behavior and aid in determining user identity. The data vectors 328a-g are high-dimensional vectors generated based on different personas 202a-m and/or roles 204a-k.

The clicks history embedding process 600 involves at 602, dividing the user clicks data into a plurality of data time slices. That is, the user clicks data is cut into small time slices by a given time window (t1, t2, . . . tn−1, tn). Each time slice is transferred into a respective binary input vector representing components clicked during this time interval. If the component is clicked, the value of the corresponding position in the binary input vector is set to 1.

Specifically, the ADAR service 120 generates a first input vector 604a for the time interval t1 in which the user interacted with $2^{nd}$ and $3^{rd}$ components of the cloud portal 100, a second input vector 604b for the time interval t2 in which the user interacted with $3^{rd}$ and $4^{th}$ components of the cloud portal 100, a third input vector 604c in which the user interacted with the component of the cloud portal 100 and an external system, and a fourth input vector 604n in which the user interacted with the first and third components of the cloud portal 100. The input vectors 604a-n are just some non-limiting examples of dividing the user clicks data into a plurality of data time slices.

At 606, the clicks history embedding process 600 involves generating a long short-term memory (LSTM) recurrent neural network (RNN) for embedding to capture time-series formatted user clicks data and extracting key information into a high-dimensional vector (one of the data vectors 328a-g). The ADAR service 120 builds the RNN in which enough data is labeled to train the model. To ensure sufficient labeled training data, inspired by contrastive learning, the ADAR service 120 clusters using the embedded network state and user profile data mentioned before and combines them with user input roles, which are then used as labels of user clicks data. A neural network (NN) deep learning model takes the high-dimensional vector generated by the RNN as the input to learning user roles. After the model is trained, the output of the last layer of NN is adopted as the embedding of user clicks history.

Specifically, at 608, the RNN is applied for embedding the LSTMs of the input vectors 604a-n. The output of the last layers of the RNN is the embeddings 610 of the user clicks history. In other words, the plurality of data time slices in the LSTM form are embedded using the RNN to form one or more data vectors 328a-g. At 612, the embeddings 610 of the user clicks history are then clustered to determine one or more of the plurality of roles 204a-k. At 614, the clicks history embedding process 600 involves determining the identity of the user based on the detected roles (user identity is equal to roles R1, R2, and R3).

Figure 4:
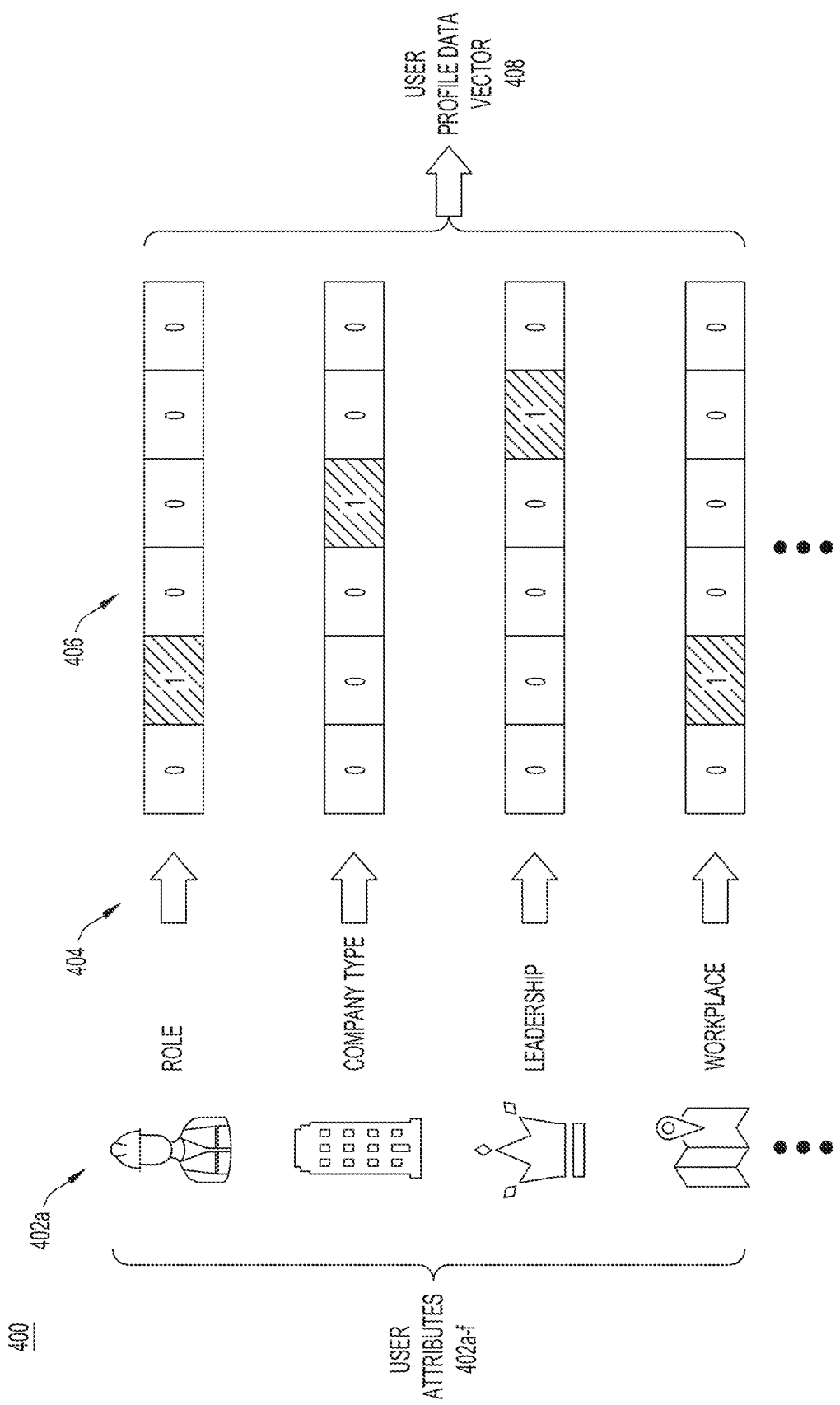
FIG. 4 is a diagram illustrating a user profile embedding process in which user profile information is embedded for determining an identity of the user, according to an example embodiment.
Figure 5:
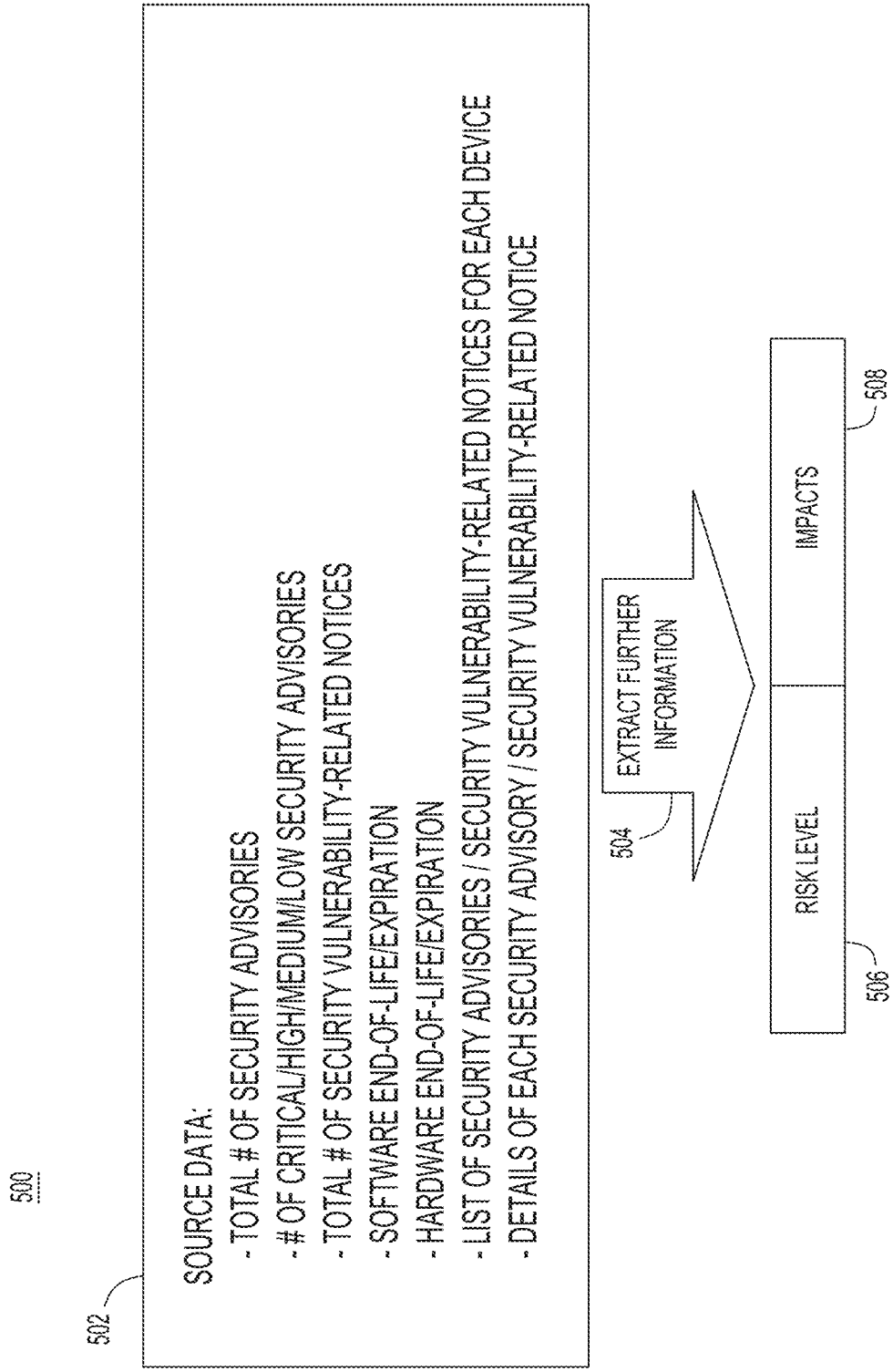
FIG. 5 is a diagram illustrating a network data embedding process in which network data is embedded for determining the identity of the user, according to an example embodiment.
Figure 6:
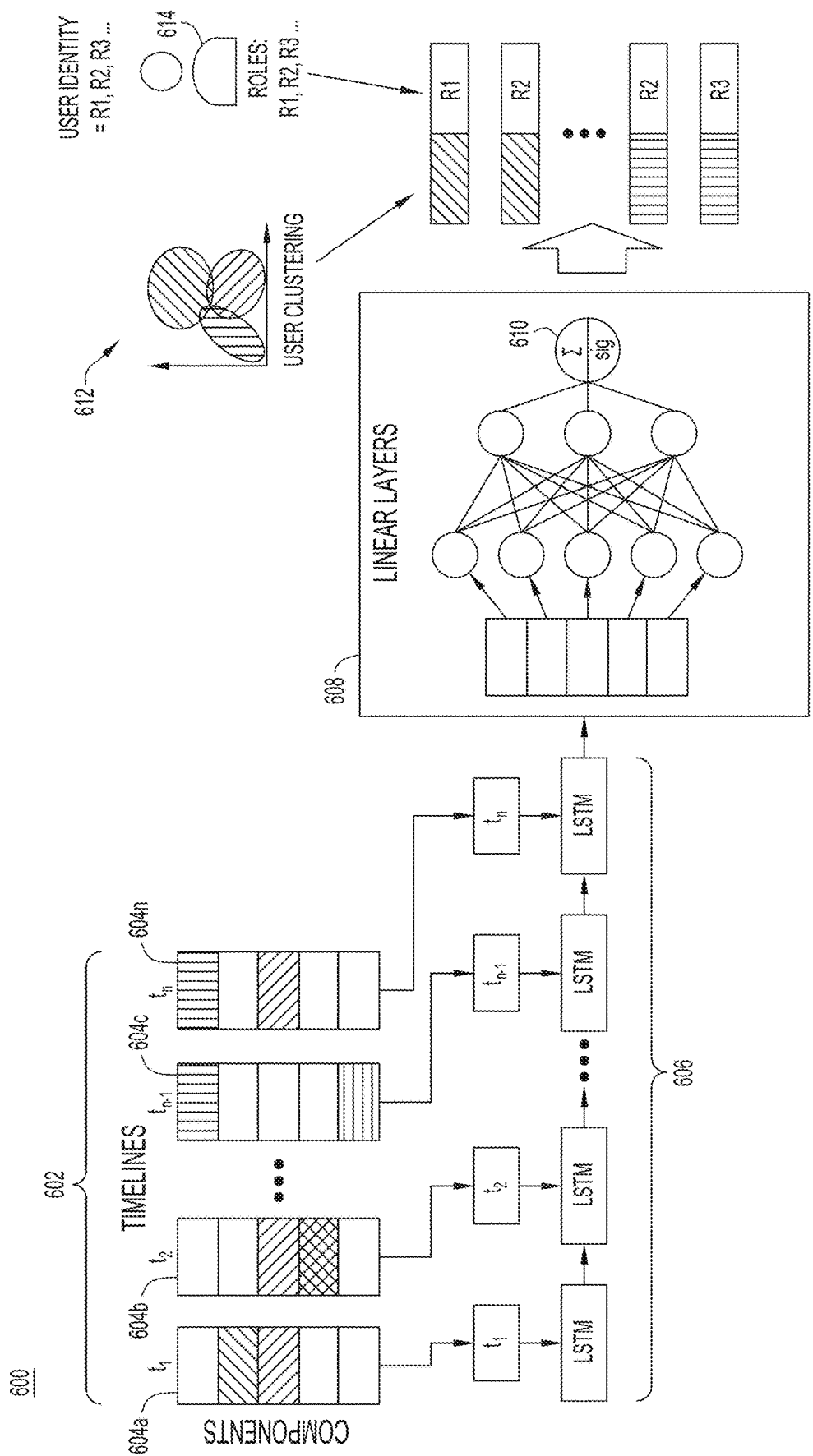
FIG. 6 is a diagram illustrating a clicks history embedding process in which clicks history data is embedded for determining the identity of the user, according to an example embodiment.

The techniques presented above with respect to FIGS. 4-6, illustrate generating different embeddings or the data vectors 328a-g of FIG. 3. The ADAR service 120 uses the data vectors 328a-g to learn the user's persona(s) and/or role(s). By determining the identity of the user, the ADAR service 120 generates customized and user-specific predictions of the user's daily behaviors. The ADAR service 120 thus generates user-tailored task recommendations that may involve various components of the cloud portal 100. Different components/functionalities of the cloud portal 100 are recommended to the users depending on their different daily duties. By embedding various information sources such as, but not limited to, the user profile, network information reflecting user's network security and static status, and user's daily usage habits (shown by historical clicks data), the ADAR service 120 learns user characteristics (persona(s) and role(s)) for generating customized task recommendations.

Figure 7:
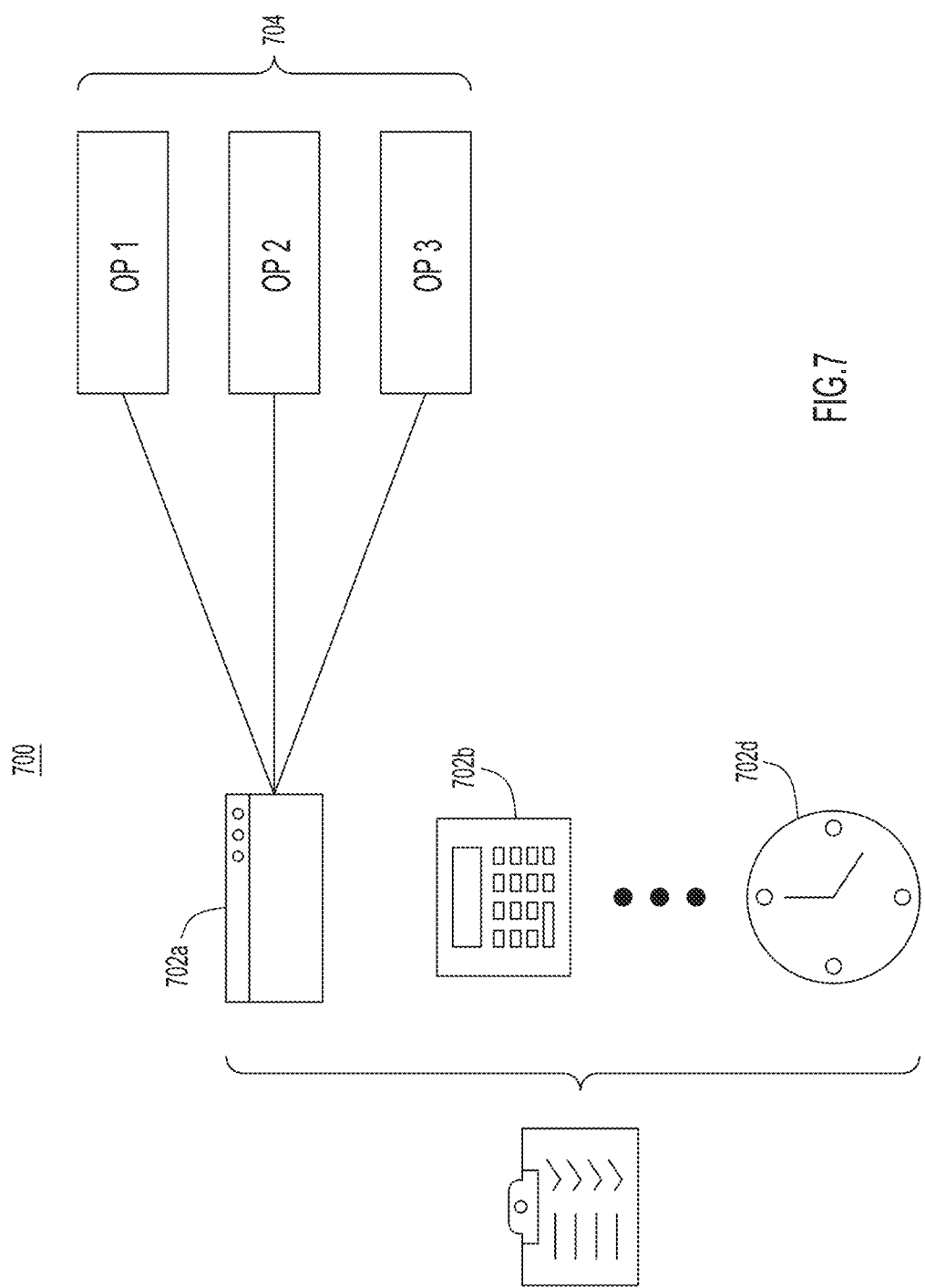
FIG. 7 is a view illustrating a customized task recommendation that involves a plurality of tasks, according to an example embodiment.
Figure 8:
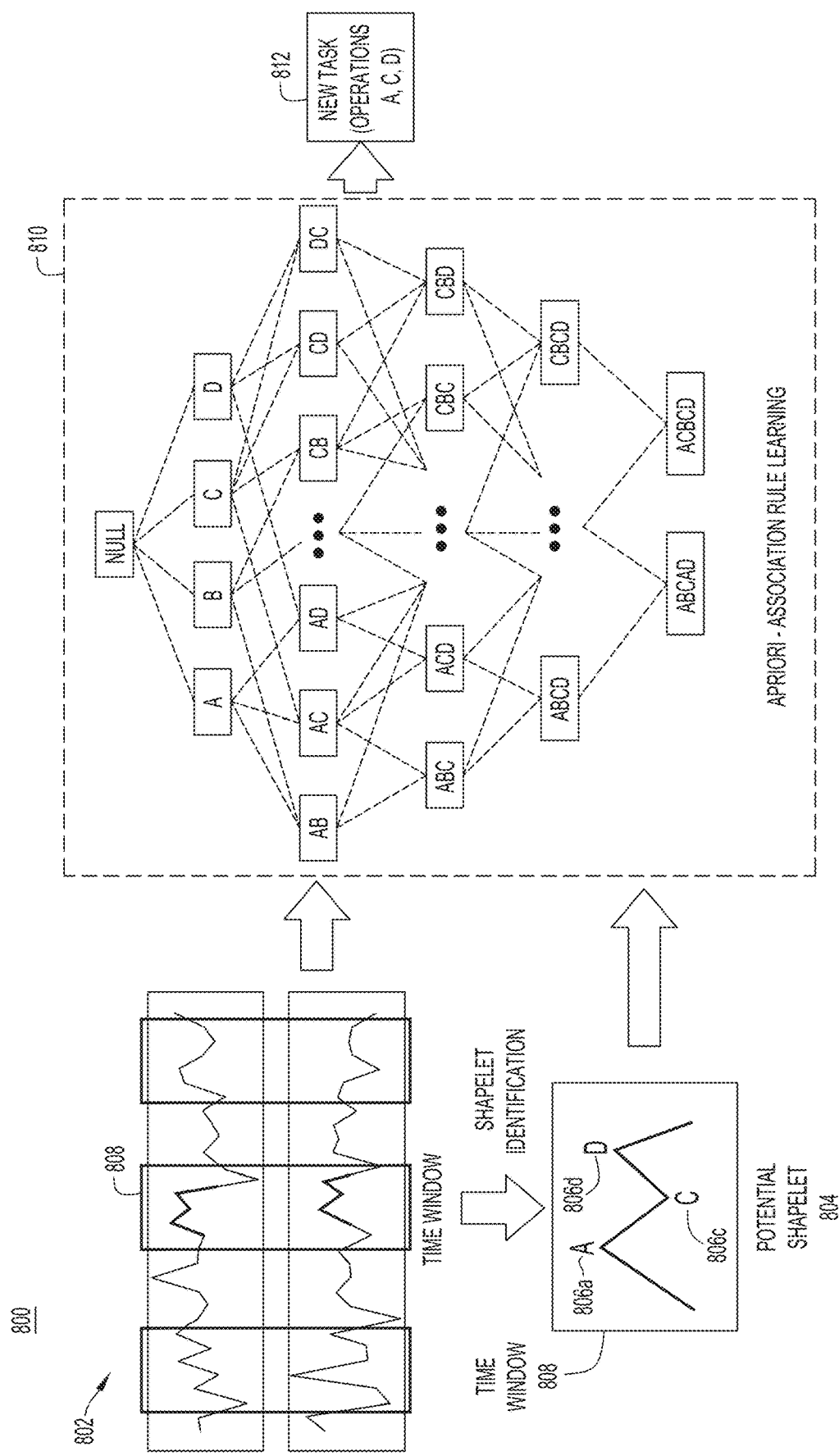
FIG. 8 is a flow diagram illustrating a process of defining one or more new tasks using machine learning, according to an example embodiment.
Figure 9:
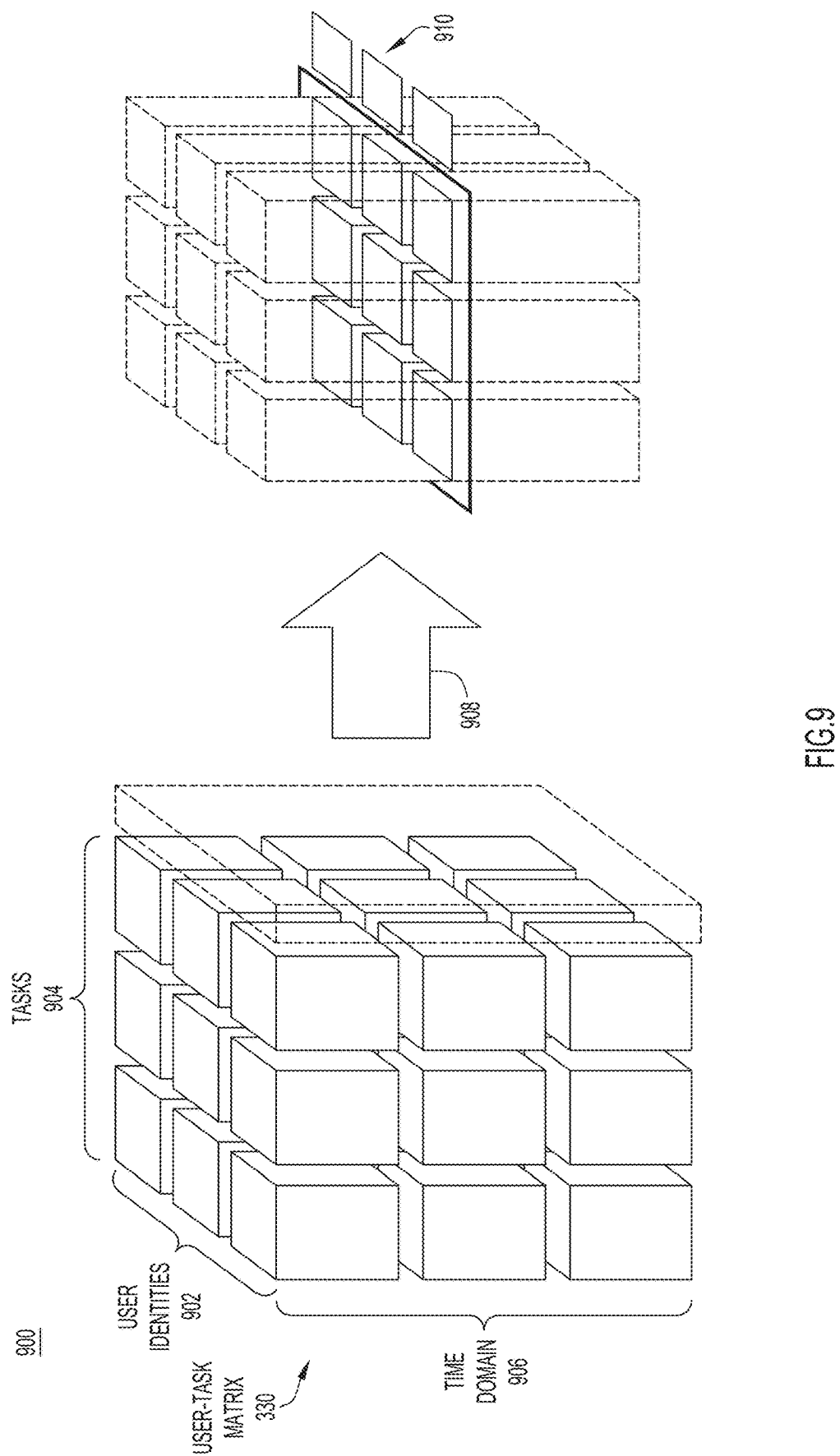
FIG. 9 is a diagram illustrating a selection process in which one or more tasks are selected from a user-task matrix based on the identity of the user, according to an example embodiment.

FIG. 7 is a view illustrating a customized task recommendation 700 that involves a plurality of tasks, according to an example embodiment. The ADAR service 120 generates the customized task recommendation 700 by extracting various tasks from the user-task matrix 330 of FIG. 3.

Specifically, based on the identity of the user, the customized task recommendation 700 involves different types of tasks (i.e., tasks specific to the user's identity). A task involves different operations performed by the user within a predetermined time interval. An operation is one or more clicks on a component of a system.

For example, the ADAR service 120 determined the identity of the user to be a hybrid of the operator 202b and the planner 202e of FIG. 2. Accordingly, the customized task recommendation 700 involves a plurality of tasks includes (1) a security assessment task 702a, (2) an asset purchase task 702b, and (3) a monitoring task 702d.

The security assessment task 702a includes three operations 704 (Op1, Op2, and Op3) such as checking security advisories for the enterprise network, checking security vulnerability-related notices for each of the network devices The asset purchase task 702b includes presenting the user with a plurality of links to purchase additional network device(s) (e.g., router, switch, etc.). The monitoring task 702d provides the user with a connection action to network device(s) for which performance monitoring or telemetry collection is to be performed.

As another example, the ADAR service 120 determines that the user is a network engineer based on embedding the user profile data. By further obtaining the daily clicks history data of the user, the ADAR service 120 captures user's daily behavior such as visiting the "Assets & Coverage" page of the cloud portal 100 and sorting network devices by a license expiration date. Meanwhile, the user also examines the features and usage metrics of network devices on regular basis. Based on these activities of the user (daily clicks history data), the ADAR service 120 determines that the user is the planner 202e of FIG. 2 and his role includes license renewals and upgrades, as well as buy-in from decision-makers. Then, in addition to fundamental everyday tasks, the ADAR service 120 includes lifecycle-related tasks in the customized task recommendation 700.

As yet another example, the user indicated that his role is network developer when onboarding the cloud portal 100 (in the user profile, for example). However, the ADAR service 120 detects that, in addition to the day-to-day network development work, the user's actions involve handling opened cases and risk insights related to the current security state of the enterprise network. The ADAR service 120 thus determines that the user is a hybrid of the developer 202m of FIG. 2 and the operator 202b of FIG. 2 (with the network role 204a and the security role 204b). The ADAR service 120 then generates the customized task recommendation 700 that includes tasks linked to the risk score, software version verification, solutions of current security advisories, and security vulnerability-related notices to guarantee that the enterprise network operates securely and stably.

With continued reference to FIGS. 1-3, FIG. 8 is a flow diagram illustrating a process 800 of defining one or more new tasks using machine learning, according to an example embodiment. The process 800 is performed by the ADAR service 120 using components such as the deep recommendation engine 340 and the feedback loop 346 of FIG. 3.

To recommend tasks to the user that are useful, the tasks need to be smartly defined. In one example, the tasks are defined by analyzing user design documents and consulting experts. Using the foregoing, the task repository 310 stores meaningful, basic daily tasks that are typically, performed by various users (personas 202a-m with various roles 204a-k).

The deep recommendation engine 340 further analyzes activities of the users to detect patterns and define new custom tasks. The deep recommendation engine 340 establishes an ML pipeline to extract or define meaningful tasks automatically.

The process 800 involves, at 802, identifying one or more shapelets in the user clicks history data. Shapelets are subsequences that are maximally representative of a task. In other words, shapelets define a set of sequential operations performed by the user within a predetermined time interval that are determined to have a relationship or an association with one another. A potential shapelet 804 illustrates that the user performed sequential operations (operation A 806a, operation C 806c, and operation D 806d) within a predetermined time window 808 (time interval). These operations (the operation A 806a, the operation C 806c, and the operation D 806d) appear to be associated with one another.

The process 800 further involves, at 810, applying machine learning to the potential shapelet 804 to generate a new task 812. In one example, the deep recommendation engine 340 applies an associate rule learning (e.g., algorithm for frequent item set mining and association rule learning "APRIORI") to discover or determine highly related operations in the potential shapelet 804. The deep recommendation engine 340 searches for patterns, correlations, associations between various operations being performed within the time window 808. If correlations are detected (e.g., operations A, C, and D, are related), a new task 812 is defined. The new task 812 is stored in the task repository 310 in an embedded form. The new task 812 is also added to the user-task matrix 330 using the feedback loop 346.

With continued reference to FIGS. 1-3, FIG. 9 is a diagram illustrating a selection process 900 in which one or more tasks are selected from the user-task matrix 330 of FIG. 3 based on the identity of the user, according to an example embodiment.

The user-task matrix 330 includes correlation information between a plurality of user identities 902 and a plurality of tasks 904 in time domain 906. The user-task matrix 330 is generated using user-related information, (user profiles, user clicks history data, and network data in an embedded form) and tasks (also in an embedded form). The correlation information (the numerical and semantic features) is transformed into the user-task matrix 330. The correlation information is input to the machine learning model and used to demonstrate user usage of the cloud portal 100 dashboard. In the user-task matrix 330, each dimension represents one user information, tasks that the user performed, and the date/time when the user finished the tasks, respectively.

Based on the determined identity of the user, at 908, the deep recommendation engine 340 of FIG. 3 extracts recommendation tasks 910 from the user-task matrix 330. Additionally, the deep recommendation engine 340 predicts the probability that the user is going to perform the extracted recommendation tasks 910. The extracted recommendation tasks 910 are sorted based on the probability (likelihood) the user is going to perform these tasks.

The techniques presented above provide an end-to-end daily task recommendation system based on multiple data sources in a highly customizable way for the cloud portal 100 and other management systems. The techniques detect identities of the users including user persona(s) and role(s) and generate customized task recommendations based on various user characteristics and network data. In addition, the techniques monitor user clicks history data to define new tasks i.e., identify previously undefined tasks.

The techniques presented above generate daily task recommendations based on determined user identities that involve user personas, roles, and network data. The techniques prioritize daily task recommendations based on user clicks history, user profiles, and network data such that top priority jobs are provided first. The techniques further provide cold start task recommendations using machine learning and comparing similarly situated peers. The techniques further include a feedback loop for updating the model and parameters using machine learning of user adjusted and performed. The techniques presented above easily integrate new features and components of an enterprise network and management systems by detecting user interactions and defining new tasks.

Figure 10:
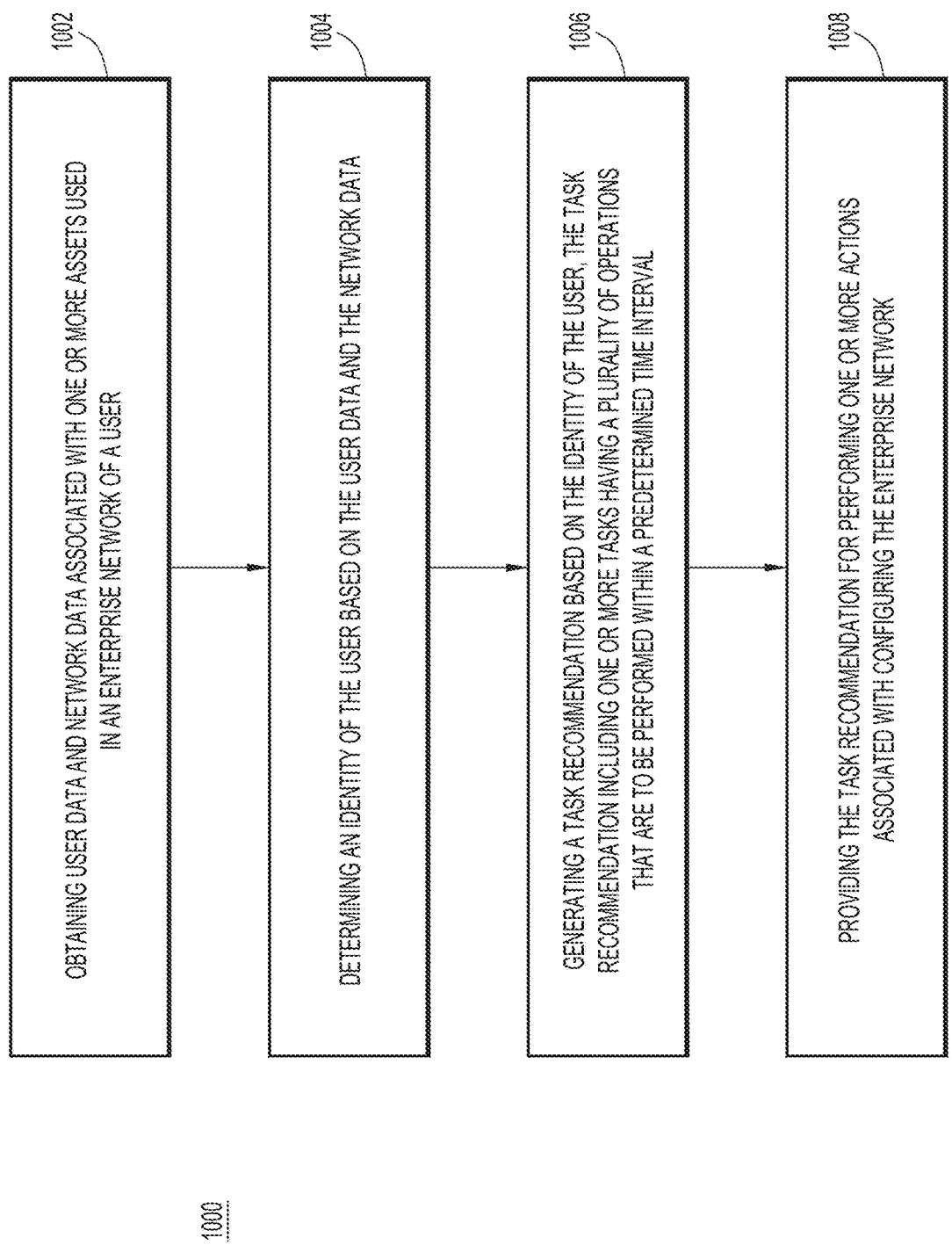
FIG. 10 is a flowchart illustrating a method of providing task recommendation for performing one or more actions associated with configuring the enterprise network, according to an example embodiment.

FIG. 10 is a flowchart illustrating a method 1000 of providing task recommendation for performing one or more actions associated with configuring the enterprise network, according to an example embodiment. The method 1000 may be performed by a computing device such as a server or a group of servers that execute the ADAR service 120 of FIGS. 1-9.

The method 1000 involves, at 1002, a computing device obtaining user data and network data associated with one or more assets used in an enterprise network of a user.

The method 1000 further involves at 1004, the computing device determining an identity of the user based on the user data and the network data.

Additionally, the method 1000 involves at 1006, the computing device generating a task recommendation based on the identity of the user. The task recommendation includes one or more tasks having a plurality of operations that are to be performed within a predetermined time interval.

The method 1000 further involves at 1008, the computing device providing the task recommendation for performing one or more actions associated with configuring the enterprise network.

In one form, the operation 1002 of obtaining the user data may include obtaining a user profile that includes one or more of: a persona that identifies a job title of the user, a role of the user that identifies the one or more actions to be performed by the user for configuring the enterprise network, an enterprise type, an enterprise size, and an asset type of each of the one or more assets. The operation 1002 of obtaining the user data may further include obtaining a click history of the user. The click history may be indicative of the one or more actions performed by the user with respect to one or more components of the enterprise network.

In another form, the operation 1002 of obtaining the network data may include one or more of obtaining a status of each of the one or more assets, obtaining a state of the enterprise network, obtaining security information related to the one or more assets and the enterprise network, obtaining one or more network technologies being deployed using the one or more assets of the enterprise network, and obtaining progression of each deployment of the one or more network technologies.

In yet another form, the operation 1002 of obtaining the user data may include obtaining a click history of the user. The click history may be indicative of the one or more actions performed by the user with respect to one or more components of the enterprise network.

In one instance, the method 1000 may further include dividing the click history into a plurality of data time slices and embedding the plurality of data time slices using a recurrent neural network to form a plurality of vectors. The operation 1004 of determining the identity of the user may be based on clustering the plurality of vectors.

In another instance, the method 1000 may further involve identifying one or more shapelets in the click history, generating a new task by applying machine learning to the one or more shapelets, and storing the new task in a data repository for generating the task recommendation.

According to one or more example embodiments, the operation 1006 of generating the task recommendation may include obtaining, from a data repository, a user task matrix that includes correlation information between a plurality of user identities and a plurality of tasks and selecting the one or more tasks from the plurality of tasks in the user task matrix based on the identity of the user.

In one instance, the plurality of tasks, relating to configuring a plurality of enterprise networks, may be stored in the user task matrix in an embedded form based on machine learning.

In another instance, the method 1000 may further include obtaining the one or more actions performed by the user based on the task recommendation and updating the user task matrix based on the one or more actions performed by the user.

In yet another instance, the operation 1006 of generating the task recommendation may include selecting at least two tasks from the plurality of tasks in the user task matrix based on the identity of the user and ordering the at least two tasks based on a probability of the user executing a respective task.

Figure 11:
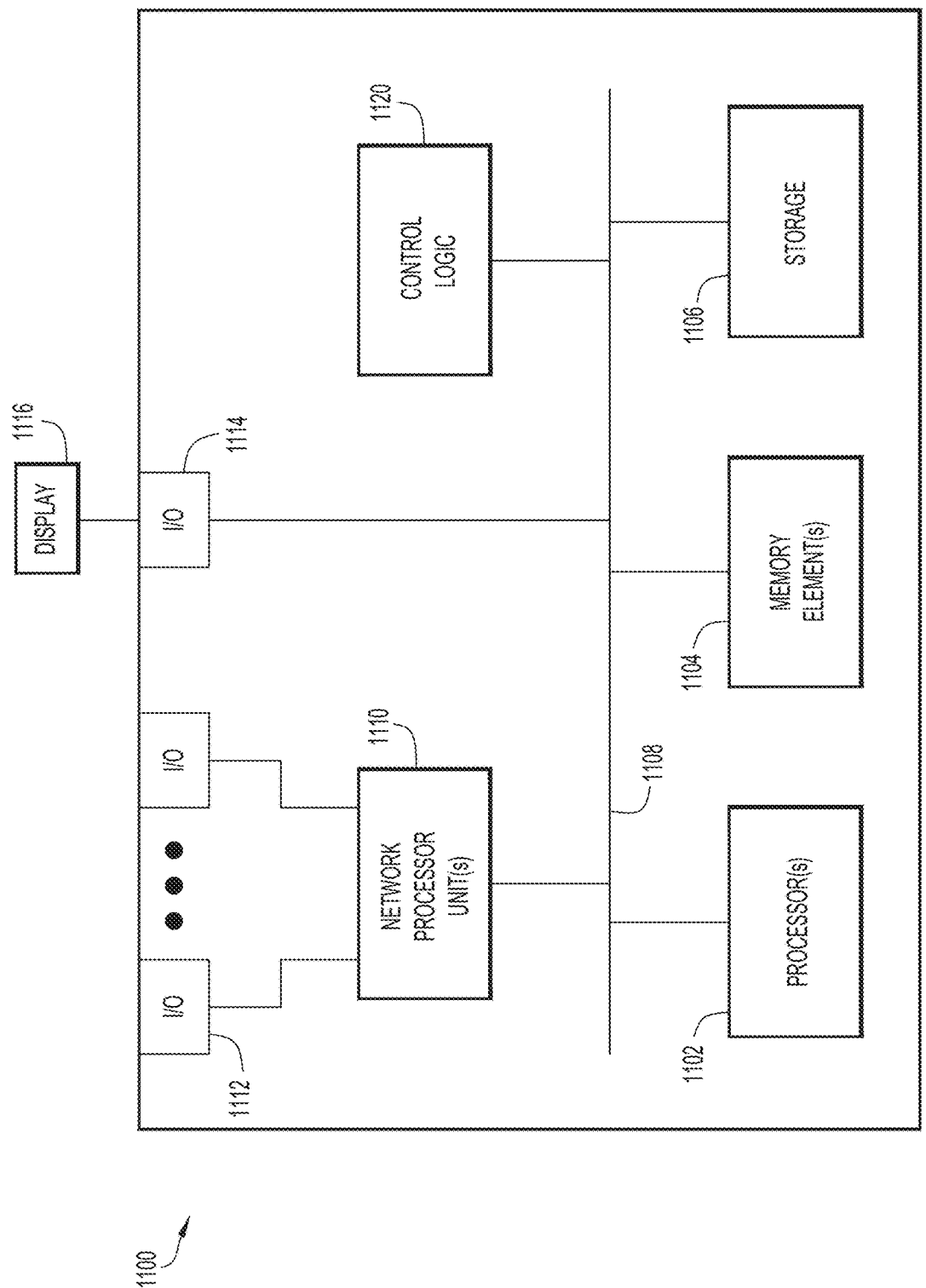
FIG. 11 is a hardware block diagram of a computing device that may perform functions associated with any combination of operations in connection with the techniques depicted and described in FIGS. 1-10, according to various example embodiments.

FIG. 11 is a hardware block diagram of a computing device 1100 that may perform functions associated with any combination of operations in connection with the techniques depicted in FIGS. 1-10, according to various example embodiments, including, but not limited to, operations of the computing device or one or more servers that execute the cloud portal 100 and/or the ADAR service 120. Further, the computing device 1100 may be representative of one of the network devices, network/computing equipment, or hardware asset of an enterprise. It should be appreciated that FIG. 11 provides only an illustration of one example embodiment and does not imply any limitations with respect to the environments in which different example embodiments may be implemented. Many modifications to the depicted environment may be made.

In at least one embodiment, computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with one or more memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1116, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform operations including obtaining user data and network data associated with one or more assets used in an enterprise network of a user. The operations further include determining an identity of the user based on the user data and the network data and generating a task recommendation based on the identity of the user. The task recommendation includes one or more tasks having a plurality of operations that are to be performed within a predetermined time interval. The operations further include providing the task recommendation for performing one or more actions associated with configuring the enterprise network.

In yet another example embodiment, one or more non-transitory computer readable storage media encoded with instructions are provided. When the media is executed by a processor, the instructions cause the processor to execute a method that includes obtaining user data and network data associated with one or more assets used in an enterprise network of a user. The method further includes determining an identity of the user based on the user data and the network data and generating a task recommendation based on the identity of the user. The task recommendation includes one or more tasks having a plurality of operations that are to be performed within a predetermined time interval. The method further includes providing the task recommendation for performing one or more actions associated with configuring the enterprise network.

In yet another example embodiment, a system is provided that includes the devices and operations explained above with reference to FIGS. 1-11.

The programs described herein (e.g., control logic 1120) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1106 and/or memory elements(s) 1104 can store data, software, code, instructions (e.g., processor instructions), logic, parameters, combinations thereof, and/or the like used for operations described herein. This includes the storage 1106 and/or memory elements(s) 1104 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' one or more of, 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a computing device, user data and network data associated with one or more assets including a network device used in an enterprise network of a user and includes obtaining a click history of the user, the click history being indicative of a plurality of actions performed by the user with respect to one or more components of the enterprise network;
    determining, by the computing device, an identity of the user based on the user data and the network data;
    generating, by a recommendation engine, a task recommendation that includes one or more tasks having a plurality of operations that are to be performed within a predetermined time interval based on the identity of the user and user task information that includes parameters correlating the one or more tasks and the identity of the user;
    providing, by the computing device, the task recommendation for performing one or more actions associated with configuring the enterprise network;
    tracking an execution of the one or more actions in the task recommendation, wherein the execution of the one or more actions includes automatically configuring one or more of: a security software, a system software, an operating system, or a hardware in the network device of the enterprise network as defined in the task recommendation and wherein tracking the execution involves collecting task data that includes one or more of a finished task, an in progress task, and/or an undefined task, in the task recommendation;
    generating, by the recommendation engine, an updated user task information by updating the parameters in the user task information based on the task data; and
    generating, by the recommendation engine, a new task recommendation including the one or more actions associated with configuring the enterprise network based on the updated user task information.

2. The method of claim 1, wherein obtaining the user data includes: obtaining a user profile that includes one or more of: a persona that identifies a job title of the user, a role of the user that identifies the one or more actions to be performed by the user for configuring the enterprise network, an enterprise type, an enterprise size, and an asset type of each of the one or more assets.

3. The method of claim 2, wherein obtaining the network data includes one or more of:
    obtaining a status of each of the one or more assets,
    obtaining a state of the enterprise network,
    obtaining security information related to the one or more assets and the enterprise network,
    obtaining one or more network technologies being deployed using the one or more assets of the enterprise network, and
    obtaining progression of each deployment of the one or more network technologies.

4. The method of claim 1, further comprising:
    dividing the click history into a plurality of data time slices; and
    embedding the plurality of data time slices using a recurrent neural network to form a plurality of vectors,
    wherein determining the identity of the user is based on clustering the plurality of vectors.

5. The method of claim 1, further comprising:
identifying one or more shapelets in the click history;
generating a new task by applying machine learning to the one or more shapelets; and
storing the new task in a data repository for generating the task recommendation.

6. The method of claim 1, wherein generating the task recommendation includes:
obtaining, from a data repository, the user task information which includes a user task matrix; and
selecting the one or more tasks from a plurality of tasks in the user task matrix based on the identity of the user.

7. The method of claim 6, wherein the plurality of tasks, relating to configuring a plurality of enterprise networks, are stored in the user task matrix in an embedded form based on machine learning.

8. The method of claim 6, further comprising:
obtaining the one or more actions performed by the user based on the task recommendation; and
updating the user task matrix based on the one or more actions performed by the user.

9. The method of claim 6, wherein generating the task recommendation includes:
selecting at least two tasks from the plurality of tasks in the user task matrix based on the identity of the user; and
ordering the at least two tasks based on a probability of the user executing a respective task.

10. The method of claim 1, wherein the user task information is a three-dimensional representation of correlation information that includes user identities embedded as a plurality of data vectors that are correlated to a plurality of embedded tasks in a time domain and further comprising:
training the recommendation engine using a feedback loop in which the task data that includes information about the execution of the one or more actions in the task recommendation is provided to the recommendation engine to generate the new task recommendation.

11. The method of claim 1, wherein tracking the execution of the one or more actions in the task recommendation further includes collecting the finished task of changing a configuration of the network device.

12. The method of claim 1, wherein automatically configuring one or more of: the security software, the system software, an operating system, or the hardware in the network device includes:
connecting to the network device; and
changing a configuration of the network device to fix a network problem or a security issue.

13. The method of claim 12, wherein automatically configuring one or more of: a security software, a system software, an operating system, or the hardware in the network device further includes:
generating a notification based on changing the configuration of the network device; and
providing, to the recommendation engine, the notification for tracking the execution of the one or more actions.

14. An apparatus comprising:
a memory;
a network interface configured to enable network communications; and
a processor, wherein the processor is configured to perform a method comprising:
obtaining user data and network data associated with one or more assets including a network device used in an enterprise network of a user and includes obtaining a click history of the user, the click history being indicative of a plurality of actions performed by the user with respect to one or more components of the enterprise network;
determining an identity of the user based on the user data and the network data;
generating, by a recommendation engine, a task recommendation that includes one or more tasks having a plurality of operations that are to be performed within a predetermined time interval based on the identity of the user and user task information that includes parameters correlating the one or more tasks and the identity of the user;
providing the task recommendation for performing one or more actions associated with configuring the enterprise network;
tracking an execution of the one or more actions in the task recommendation, wherein the execution of the one or more actions includes automatically configuring one or more of: a security software, a system software, an operating system, or a hardware in the network device of the enterprise network as defined in the task recommendation and wherein tracking the execution involves collecting task data that includes one or more of a finished task, an in progress task, and/or an undefined task, in the task recommendation;
generating, by the recommendation engine, an updated user task information by updating the parameters in the user task information based on the task data; and
generating, by the recommendation engine, a new task recommendation including the one or more actions associated with configuring the enterprise network based on the updated user task information.

15. The apparatus of claim 14, wherein the processor is configured to obtain the user data by:
obtaining a user profile that includes one or more of: a persona that identifies a job title of the user, a role of the user that identifies the one or more actions to be performed by the user for configuring the enterprise network, an enterprise type, an enterprise size, and an asset type of each of the one or more assets.

16. The apparatus of claim 15, wherein the processor is configured to obtain the network data by performing one or more of:
obtaining a status of each of the one or more assets,
obtaining a state of the enterprise network,
obtaining security information related to the one or more assets and the enterprise network,
obtaining one or more network technologies being deployed using the one or more assets of the enterprise network, and
obtaining progression of each deployment of the one or more network technologies.

17. The apparatus of claim 14, wherein the processor is further configured to perform:
dividing the click history into a plurality of data time slices; and
embedding the plurality of data time slices using a recurrent neural network to form a plurality of vectors,
wherein determining the identity of the user is based on clustering the plurality of vectors.

18. The apparatus of claim 14, wherein the processor is further configured to perform:
identifying one or more shapelets in the click history;
generating a new task by applying machine learning to the one or more shapelets; and storing the new task in a data repository for generating the task recommendation.

19. One or more non-transitory computer readable storage media encoded with software comprising computer executable instructions that, when executed by a processor, cause the processor to perform a method including:
   obtaining user data and network data associated with one or more assets including a network device used in an enterprise network of a user and includes obtaining a click history of the user, the click history being indicative of a plurality of actions performed by the user with respect to one or more components of the enterprise network;
   determining an identity of the user based on the user data and the network data;
   generating, by a recommendation engine, a task recommendation that includes one or more tasks having a plurality of operations that are to be performed within a predetermined time based on the identity of the user and user task information that includes parameters correlating the one or more tasks and the identity of the user;
   providing the task recommendation for performing one or more actions associated with configuring the enterprise network;
   tracking an execution of the one or more actions in the task recommendation, wherein the execution of the one or more actions includes automatically configuring one or more of: a security software, a system software, an operating system, or a hardware in the network device of the enterprise network as defined in the task recommendation and wherein tracking the execution includes collecting task data that includes one or more of a finished task, an in progress task, and/or an undefined task, in the task recommendation;
   generating, by the recommendation engine, an updated user task information by updating the parameters in the user task information based on the task data; and
   generating, by the recommendation engine, a new task recommendation including the one or more actions associated with configuring the enterprise network based on the updated user task information.

20. The one or more non-transitory computer readable storage media according to claim 19, wherein the computer executable instructions cause the processor to obtain the user data by:
   obtaining a user profile that includes one or more of: a persona that identifies a job title of the user, a role of the user that identifies the one or more actions to be performed by the user for configuring the enterprise network, an enterprise type, an enterprise size, and an asset type of each of the one or more assets.

* * * * *